United States Patent Office 3,018,132
Patented Jan. 23, 1962

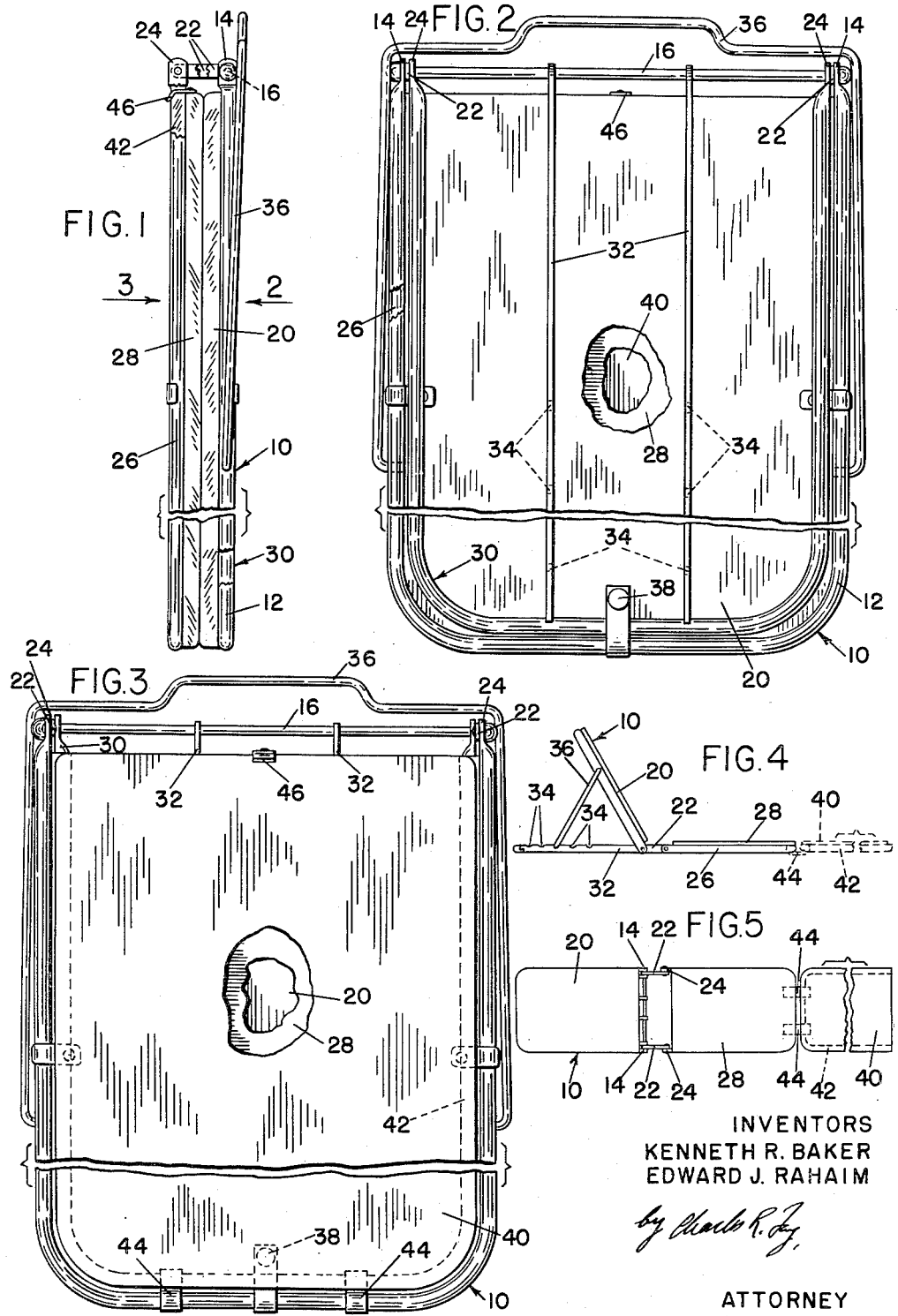

3,018,132
FOLDING LOUNGE SEAT
Kenneth R. Baker, 8 Hawes St., Fitchburg, Mass., and Edward J. Rahaim, 218 Woodland Ave., Gardner, Mass.
Filed May 12, 1960, Ser. No. 28,578
4 Claims. (Cl. 297—377)

This invention relates to a new and improved folding lounge seat, and the principal objects of the invention reside in the provision of an easily foldable and extensible seat or lounge for lawn, porch, and beach use as well as in other situations, the same being strong and sturdy and having a rigid back-supporting member articulated with respect to a rigid seat member, together with an adjustment for varying the inclination of the backrest relative to the seat, a carrying handle, and means for holding the backrest and seat in folded condition.

A further object of the invention resides in the provision of a folding lounge seat as above described in which there is a rigid back member comprising a panel mounted on a frame and a seat member also comprising a panel mounted on a frame, the frames being pivotally interconnected, together with a third inter-pivoted member comprising an adjustable support for a swinging member which adjustably locates and supports the backrest in adjustable position, said swinging member being usable as a handle; and the provision of a folding seat as above described including a leg supporting member.

The invention further relates to arrangements and combinations of parts which will be hereinafter described and more particularly set forth in the appended claims.

Reference is to be had to the accompanying drawings, in which:

FIG. 1 is an edge view showing the device folded;

FIG. 2 is a view in elevation locking in the direction of arrow 2 in FIG. 1;

FIG. 3 is a view in elevation looking in the direction of arrow 3 in FIG. 1, and FIGS. 4 and 5 are diagrammatic views illustrating the invention.

In carrying out the present invention, a backrest panel member 10 is formed of a generally U-shaped frame member 12 having free-ended legs flattened as shown at 14 and supporting between them a pivot rod, supporting member or the like 16. A rigid panel 20 conveniently made of plywood appropriately covered, etc., or it may be made in any other way desired, is attached to the frame by any desired means such as rivets, brackets, and the like, but in any event it is to be seen that the backrest 10 is a rigid member and is mounted to pivot with relation to rod 16.

On rod 16 at each end thereof there are provided a pair of links 22, one at each end, and the other ends of these links are pivoted on the free ends 24 of another U-shaped frame 26 which together with a panel 28 similar to that at 20 forms a rigid seat, the links providing for folding of the two members as seen in FIG. 1 by spacing the U-shaped members 20 and 26 apart a slight distance. If desired, the seat frame at 28 may be provided with another articulated member to support the legs and be extended out therefrom as will be later described.

Pivoted on the rod 16 is another U-shaped frame generally indicated at 30 and this is of a size to neatly fit within the U-shaped frame 12 as clearly seen in FIG. 2. The U-shaped frame 30 is provided with a pair of parallel bars which are made in fixed relation thereto and are indicated at 32. These bars as shown in FIGS. 2 and 4 are provided with a series of notches 34 on the edges thereof which face inwardly toward the panel 20.

Swingably mounted intermediate the ends of the legs of the U-shaped member 12 is a U-shaped carrying handle 36 and this has the combined function of use as a carrying handle and also of engaging any one of the notches 34, in order to adjust the inclination of the backrest 10 with relation to the seat portion 20 as shown in FIG. 4.

A strap 38 may be utilized to hold the various folding parts together when the same is being carried by the handle 36 and the strap may extend around from one member to the other in any way desired and as well known in the art. The links at 22 act to extend the seat portion of the device as shown in FIG. 4, as well as providing for spacing of the parts, and the leg supporting member may be made of a U-shaped frame and solid panel as are the seat and the backrest member to conveniently fit within the U-shaped member 26 as shown in FIG. 3. This leg supporting member is shown as comprising a panel 40 and a frame 42. The frame 42 may be connected to the frame 26 by means of pivoted links 44 or by any other means desired, but in any event the panel 40 is extendable from the seat portion of the device for extension thereof to support the legs of the user. Frame 42 may be held to seat 28 by a spring clip 46 fast to the seat 28 as in FIGS. 1 and 3.

It will be seen that this device may be easily carried as it is of light-weight, strong construction and provides a firm support for the back and the seat as well as the alternative use of the leg support if desired. The device is rugged and long-lasting and is easily carried by a person or in a vehicle. It may be used as a seat at any inclination of the backrest if desired, or it may be used flat to use as a sleeping mat.

Having thus described our invention and the advantages thereof, we do not wish to be limited to the details herein disclosed, otherwise than as set forth in the claims, but what we claim is:

1. A folding lounge seat comprising a pair of U-shaped frames each having an open end, a pair of links inter-pivoting the legs forming said U-shaped frames at their respective ends, said frames being spaced by the links and being movable into extended or folded relationship, a solid panel secured to each frame, said solid panels facing each other in contacting relation when said frames are in folded condition, a carrying handle pivoted to one of said frames, a third U-shaped frame pivoted adjacent the links, interengaging means for said handle and third frame for adjustable positioning of the U-shaped frame to which the handle is mounted for use of its panel as a backrest in adjustable raised position from the third named frame, another panel being used as a seat.

2. The lounge seat of claim 1 including an extension on the seat panel for use as a leg support.

3. The lounge seat of claim 1 wherein the third frame interfits within another U-shaped frame when folded.

4. The lounge seat of claim 1 including an extension on the seat panel for use as a leg support, said extension being pivoted to and fitting within the U-shaped frame to which the seat panel is secured.

References Cited in the file of this patent
UNITED STATES PATENTS

| | | |
|---|---|---|
| 2,663,029 | Whitley et al. | Dec. 22, 1953 |
| 2,834,032 | Scott | May 13, 1958 |
| 2,857,957 | Gay | Oct. 28, 1958 |
| 2,884,991 | Bloomquist | May 5, 1959 |
| 2,915,154 | Holder | Dec. 1, 1959 |